United States Patent

Grosswiller et al.

[11] Patent Number: 5,299,891
[45] Date of Patent: Apr. 5, 1994

[54] PNEUMATIC TUBE SYSTEM

[75] Inventors: Leo Grosswiller, East Canton; Walter G. Anders; Lawrence F. Mannella, both of North Canton, all of Ohio

[73] Assignee: Diebold, Incorporated, Canton, Ohio

[21] Appl. No.: 956,431

[22] Filed: Oct. 1, 1992

Related U.S. Application Data

[63] Continuation of Ser. No. 715,295, Jun. 14, 1991, abandoned.

[51] Int. Cl.$^5$ ............................................. B65G 51/32
[52] U.S. Cl. ........................................ 406/112; 406/84; 406/148; 406/151; 406/180
[58] Field of Search ................... 406/13, 28, 29, 83, 406/84, 110, 112, 147, 148, 151, 176, 180

[56] References Cited

U.S. PATENT DOCUMENTS

| | | | |
|---|---|---|---|
| Re. 30,882 | 3/1982 | Leavelle | 406/186 |
| 1,807,096 | 5/1931 | Zimmer | 406/110 |
| 1,892,743 | 1/1933 | Wenger | 220/318 |
| 3,189,297 | 6/1965 | Ellithorpe | 406/111 |
| 3,226,055 | 12/1965 | Suhr | 406/112 |
| 3,237,881 | 3/1966 | Grosswiller, Jr. et al. | 406/19 |
| 3,266,751 | 8/1966 | Purdy et al. | 406/189 |
| 3,298,632 | 1/1967 | Carson | 406/112 |
| 3,306,555 | 2/1967 | Tonne | 406/19 |
| 3,311,321 | 3/1967 | Hoehmann | 406/2 |
| 3,343,709 | 9/1967 | Henderson | 220/256 |
| 3,419,229 | 12/1968 | Crosby | 406/110 |
| 3,438,337 | 4/1969 | Edwards | 406/192 |
| 3,482,801 | 12/1969 | Leontas | 406/188 |
| 3,506,216 | 4/1970 | Delamater | 406/188 |
| 3,556,436 | 1/1971 | Roelandt | 406/188 |
| 3,561,591 | 2/1971 | Henderson | 206/540 |
| 3,599,898 | 8/1971 | Bontempelli | 406/112 |
| 3,601,337 | 8/1971 | Bullock et al. | 406/28 |
| 3,610,554 | 10/1971 | Schwarz et al. | 406/112 |
| 3,612,438 | 10/1971 | Herndon | 406/190 |
| 3,618,874 | 11/1971 | Kettering et al. | 406/39 |
| 3,633,976 | 1/1972 | Kruyer | 406/112 |
| 3,642,232 | 2/1972 | Kelley | 406/189 |
| 3,655,146 | 4/1972 | Woll | 406/188 |
| 3,659,809 | 5/1972 | Cook | 406/112 |
| 3,690,593 | 9/1972 | Kettering | 406/186 |
| 3,701,497 | 10/1972 | Anders et al. | 406/188 |
| 3,711,038 | 1/1973 | Van Otteren | 406/19 |
| 3,738,592 | 6/1973 | Smith et al. | 406/19 |
| 3,756,536 | 9/1973 | Weissmuller | 406/112 |
| 3,778,006 | 12/1973 | Martin | 406/112 |
| 3,788,577 | 1/1974 | Barnett et al. | 406/188 |
| 3,790,102 | 2/1974 | Tearne et al. | 406/112 |
| 3,828,698 | 8/1974 | Delamater et al. | 109/19 |
| 3,841,584 | 10/1974 | Robinson et al. | 406/21 |
| 3,940,091 | 2/1976 | Ekama et al. | 406/186 |
| 3,948,466 | 4/1976 | Rudder et al. | 406/73 |
| 3,961,721 | 6/1976 | Gordon et al. | 220/230 |
| 3,964,693 | 6/1976 | Thomas | 406/179 |
| 3,976,264 | 8/1976 | Ekama et al. | 406/112 |
| 3,985,316 | 10/1976 | Weissmuller | 406/110 |
| 3,998,405 | 12/1976 | Carlier | 406/112 |
| 4,004,753 | 1/1977 | Thomas et al. | 406/110 |
| 4,032,082 | 6/1977 | Weissmuller | 406/112 |

(List continued on next page.)

*Primary Examiner*—David M. Mitchell
*Assistant Examiner*—Andrew C. Pike
*Attorney, Agent, or Firm*—D. Peter Hochberg; Mark Kusner; Michael Jaffe

[57] ABSTRACT

The present invention provides a pneumatic transfer terminal adapted to receive and dispatch a non-captive, tubular article carrier of predetermined length from and to a single pneumatic transfer tube. The terminal includes a carrier receiver having the internal chamber dimensioned to receive an article carrier therein and to position the carrier in operable alignment with the transfer tube. The carrier receiver includes a first opening for communicating the chamber with the transfer tube and a second opening for insertion and removal of the carrier into and from the chamber. A blower assembly is attached to the transfer tube and is operable to create a vacuum therein. A gate mechanism is operable to open and close the second opening. The gate means includes a generally planar gate movable between a first position where the gate mechanism covers the second opening and a second position wherein the gate is removed from the second opening. An actuator connects the motor to the planar gate.

16 Claims, 13 Drawing Sheets

U.S. PATENT DOCUMENTS

| | | | |
|---|---|---|---|
| 4,059,246 | 11/1977 | Anders et al. | 406/31 |
| 4,084,149 | 4/1978 | Driver et al. | 367/95 |
| 4,135,684 | 1/1979 | Willey | 406/13 |
| 4,180,354 | 12/1979 | Greene | 406/112 |
| 4,189,260 | 2/1980 | Morano et al. | 406/76 |
| 4,189,261 | 2/1980 | Kelley et al. | 406/112 |
| 4,256,418 | 3/1981 | Stangl | 406/112 |
| 4,273,478 | 6/1981 | Cedergreen | 406/189 |
| 4,315,704 | 2/1982 | Kelley et al. | 406/12 |
| 4,325,660 | 4/1982 | Jones | 406/84 |
| 4,343,574 | 8/1982 | Anders | 406/13 |
| 4,352,603 | 10/1982 | Anders | 406/27 |
| 4,362,443 | 12/1982 | Mallory et al. | 406/188 |
| 4,395,164 | 7/1983 | Beltrop et al. | 406/74 |
| 4,407,613 | 10/1983 | Jones | 406/84 |
| 4,436,456 | 3/1984 | Thomas | 406/19 |
| 4,455,112 | 6/1984 | Anders | 406/110 |
| 4,462,721 | 7/1984 | Anders et al. | 406/112 |
| 4,465,410 | 8/1984 | Vogel et al. | 406/111 |
| 4,466,761 | 8/1984 | Beltrop et al. | 406/74 |
| 4,512,688 | 4/1985 | Hochradel | 406/111 |
| 4,540,317 | 9/1985 | Vogel | 406/112 |
| 4,568,225 | 2/1986 | Alexandrov et al. | 406/186 |
| 4,620,577 | 11/1986 | Nordenswan | 141/98 |
| 4,661,026 | 4/1987 | Carlier | 406/74 |
| 4,676,393 | 6/1987 | Daniel | 220/323 |
| 4,710,098 | 12/1987 | Anders et al. | 415/149.1 |
| 4,715,750 | 12/1987 | Podoll et al. | 406/111 |
| 4,735,289 | 4/1988 | Kenyon | 186/37 |
| 4,792,263 | 12/1988 | Podoll | 406/189 |
| 4,820,086 | 4/1989 | Kieronski | 406/112 |
| 4,913,598 | 4/1990 | Dozier | 406/112 |

PNEUMATIC TUBE SYSTEM

This is a continuation of co-pending application Ser. No. 07/715,295 filed on Jun. 14, 1991, now abandoned.

FIELD OF THE INVENTION

The present invention relates generally to a system for transferring articles between two locations, and more particularly to a pneumatic tube system for conveying articles in a carrier through a tube between two terminals. The present invention is applicable to banking operations in which a carrier is transferred through a tube between a customer terminal and teller terminal and will be described with particular reference thereto. The present invention, however, is not limited to banking operations and may find advantageous applications in other operations wherein it is desirable to transfer objects between two locations.

BACKGROUND OF THE INVENTION

Pneumatic transfer systems are finding increasing use in many areas, such as, for example, by banking institutions wherein such systems are used in conducting banking transactions between a bank teller and a remote customer. Documents and currency are transferred between the teller and customer in a pneumatically driven, generally cylindrical carrier through a tube connecting a teller terminal to a customer terminal.

Pneumatic transfer systems in present day use are generally of two types, i.e. captive carrier systems and non-captive carrier systems. Non-captive carrier systems are ones in which the carrier may be removed from the system to insert articles therein and to remove articles therefrom. Non-captive systems for banking applications typically utilize smaller carriers (approximately 4 inches in diameter and 10 inches in length) and smaller transfer tubes as compared to a captive carrier system which may have a carrier which is 8 inches in diameter and 15 inches in length. In this respect, the size and weight of the smaller carriers makes them more easily handled by customers, and therefore more than a larger carrier suitable for use in a non-captive carrier system. While such non-captive carriers are preferably small so as to be manageable by a customer, it is nevertheless desirable to maximize the load carrying capacity of such a carrier.

In this respect, the weight carrying capacity of any pneumatic transfer system is directly related to the ability of the system to establish and maintain air pressure or a vacuum therein, and this ability in many instances is related to the design of the system's blower assembly and to the pneumatic sealing capabilities of the system. Referring to the latter, it is typically the seal arrangement around the carrier access openings of the system's terminals which produces the greatest air leakage. In this respect, many recently developed non-captive, commercial pneumatic systems include terminals having a cylindrical housing which defines a "carrier receiver". The housing comprises or includes an extension of the transfer tube, which extension defines the carrier receiver. An opening in one side of the housing provides access into the transfer tube extension, i.e. the carrier receiver, for insertion and removal of the carrier. Such systems typically include either a hinged cylindrical door or a sliding cylindrical door for closing the access opening.

U.S. Pat. No. 4,913,598 discloses a non-captive system having a sliding cylindrical door for closing the access opening. As indicated above, a problem with such a design is providing a seal around the sliding door. In this respect, as will be appreciated, it is difficult to form a seal between two curved surfaces, especially if the pneumatic transfer system (as in U.S. Pat. No. 4,913,598) utilizes positive pressure to propel the carrier through the transfer tube, which positive pressure tends to force apart mating or joined components or surfaces.

The present invention overcomes this and other problems by providing a pneumatic transfer system for transferring a non-captive carrier between spaced-apart terminals through a transfer tube, which system includes a gate mechanism which closes and seals an access opening in a terminal along a generally planar surface, and which system utilizes vacuum pressure to propel the carrier and enhance the seal along the planar surface.

SUMMARY OF THE INVENTION

In accordance with the present invention there is provided a pneumatic transfer terminal adapted to receive and dispatch a non-captive tubular article carrier from and to a single pneumatic transfer tube. The terminals include a carrier receiver having an internal chamber dimensioned to receive an article carrier therein and to position the carrier in operable alignment with the transfer tube. The carrier receiver includes a first opening for communicating the chamber with the transfer tube and a second opening for insertion and removal of the carrier into and from the chamber. The second opening is dimensioned to receive a carrier therein wherein the carrier must be inserted in the chamber at an angle relative to the axis of the transfer tube. Means are provided for connecting the carrier receiver to the transfer tube forming a pneumatic seal therebetween. Gate means are provided to open and close the second opening, which gate means include a generally planar gate movable between a first position wherein the gate covers the second opening and a second position wherein the gate is removed from the opening. A reversible motor and actuator means connecting the motor to the planar gate are operable to move the gate means between the first and second position.

In accordance with another aspect of the present invention, there is provided a system for pneumatically transferring articles between two spaced-apart locations. The system includes a first terminal and a second terminal, each having a carrier access opening therein. An overhead transfer tube connects the first terminal to the second terminal. A non-captive, tubular carrier positionable within the transfer tube is provided and adapted to be pneumatically transferred through the tube between the first and second terminals, the carrier being manually insertable into and removable from the terminals through the access openings therein. A gate mechanism is provided on each of the terminals and includes a generally planar gate member movable between a first position closing the access opening and a second position removed from the access opening, and reversible drive means operable to move the gate member between the first position and the second position. A first blower assembly is attached to the transfer tube above the first terminal and a second blower assembly is attached to the transfer tube above the second terminal. The blower assemblies are operable to create a vacuum in the transfer tube. Circuit control means are operatively connected to the reversible drive means and the blower assemblies to transfer the carrier through the tube from one terminal to the other terminal by (1) activating the drive means on the one terminal to move the gate member to the second position to create atmospheric pressure behind the carrier; (2) activating the drive means on the other terminal to move the gate member thereon to the first position; and (3) activating the blower assembly above the other terminal to draw the carrier under the vacuum to a position above the other terminal wherein the carrier descends into the other terminal under the influence of gravity.

In accordance with another aspect of the present invention, there is provided a system for pneumatically transferring articles between two spaced-apart locations. The system includes a first terminal and a second terminal each having a carrier access opening therein. An overhead transfer tube connects the first terminal to the second terminal. A non-captive, tubular carrier positionable within the transfer tube is provided and adapted to be pneumatically transferred through the first and second terminals, the carrier being manually insertable into and removable from the terminals through the access openings. A gate mechanism is provided on each of the terminals including a generally planar gate member movable between a first position closing the access opening and a second position removed from the access opening, and reversible drive means of variable torque operable to move the gate member between the first position and the second position. Blower means are attached to the transfer tube operable to create a vacuum in the transfer tube. Circuit control means are operatively connected to the reversible drive means and the blower means to transfer the carrier through the tube from one terminal to the other terminal by selectively activating the drive means to the terminals to move the gate members to predetermined positions and by activating the blower means, the control circuit including means to reduce the torque of the motor drive means when moving the gate member toward the first position.

It is an object of the present invention to provide a point-to-point pneumatic transfer system.

Another object of the present invention is to provide a pneumatic transfer system as described above which maximizes the efficiency of a cylindrical carrier.

Another object of the present invention is to provide a pneumatic transfer system as described above which is compact and particularly applicable as a banking system for a teller-to-customer transfer operation.

Another object of the present invention is to provide a pneumatic transfer system as described above which employs a non-captive, generally cylindrical carrier in a compact, efficient system.

Another object of the present invention is to provide a pneumatic transfer system as described above wherein the teller terminal and the customer terminal are essentially identical.

Another object of the present invention is to provide a pneumatic transfer system as described above which is comprised of a single cylindrical tube utilizing a non-captive cylindrical carrier therein.

A still further object of the present invention is to provide a pneumatic transfer system as described above having a generally planar gate mechanism operable to open and close an access opening in the terminal.

A still further object of the present invention is to provide a pneumatic transfer system described above wherein the driving force for the gate mechanism is reduced when moving the gate mechanism to a closed position.

A still further object of the present invention is to provide a pneumatic transfer system as described above having safety provisions to minimize the likelihood of injury to a customer or teller.

A still further object of the present invention is to provide a pneumatic transfer system as described above which utilizes a vacuum to propel the carrier through the transfer tube.

A still further object of the present invention is to provide a pneumatic transfer system as described above which utilizes a vacuum to improve the seal between a gate member and an access opening in a terminal.

These and other objects and advantages will become apparent from the following description of a preferred embodiment of the invention taken together with the accompanying drawings.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof and wherein.

DETAILED DESCRIPTION OF PREFERRED EMBODIMENT

The System

Figure 1:
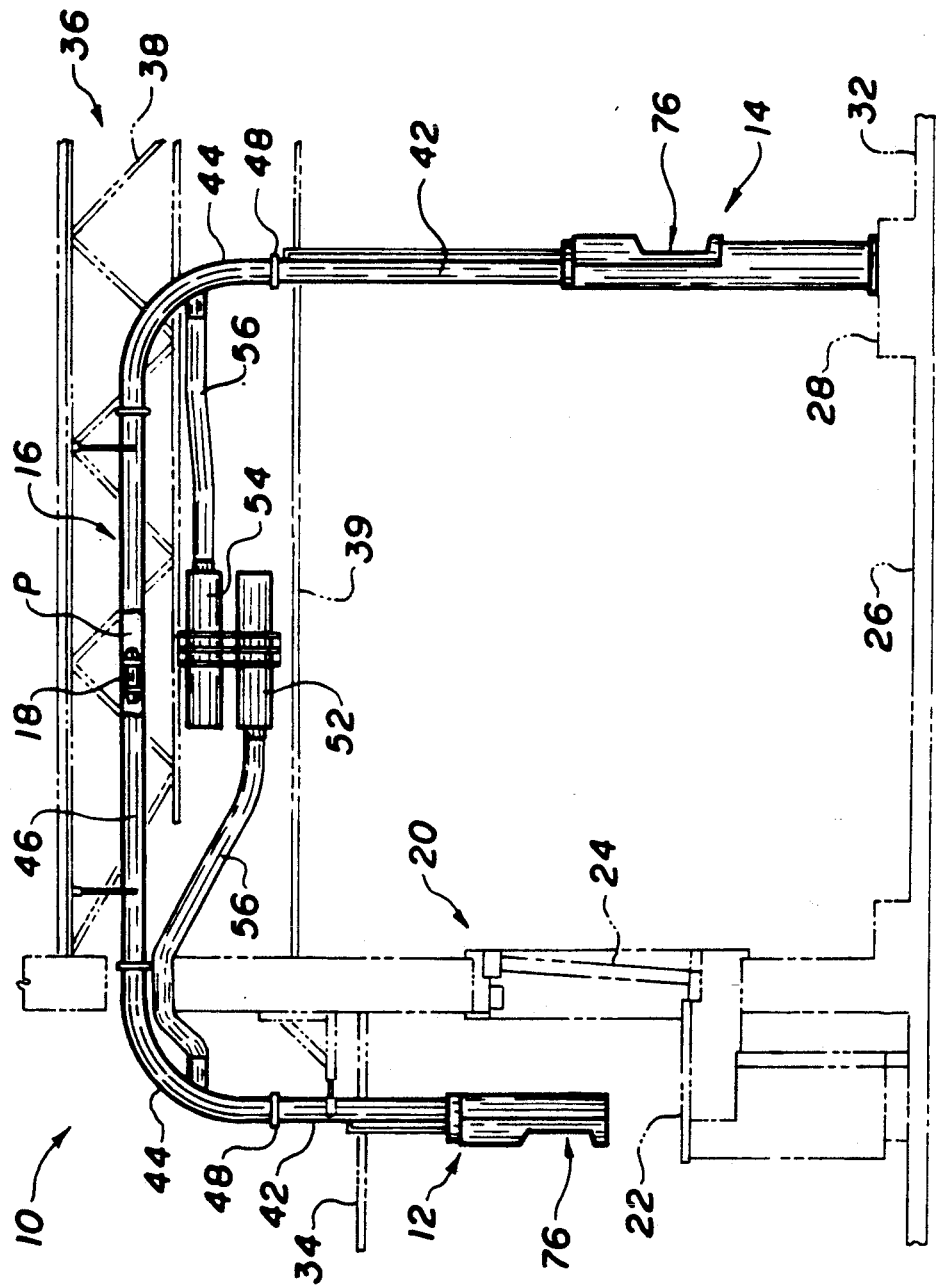
FIG. 1 is a side, elevational view of a pneumatic transfer system for use in a banking operation illustrating a preferred embodiment of the present invention.
Figure 2:
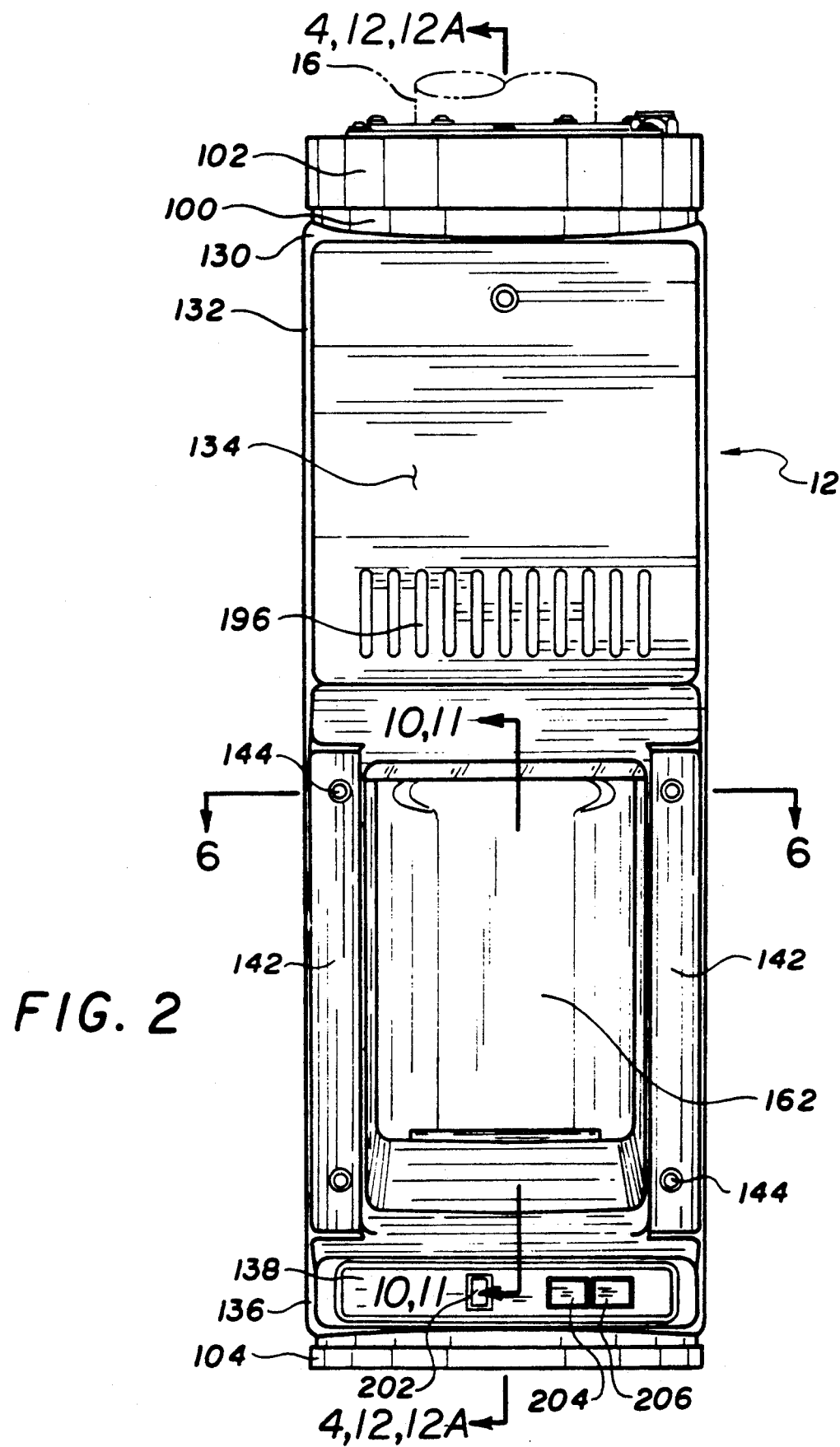
FIG. 2 is an enlarged front, elevational view of a bank teller terminal from the pneumatic transfer system shown in FIG. 1.

Referring now to the drawings wherein the showings are for the purpose of illustrating a preferred embodiment of the invention only, and not for the purpose of limiting same, FIGS. 1 and 2 show a point-to-point pneumatic transfer system 10 according to the present invention for use in a banking operation. System 10 is basically comprised of a teller terminal 12 and a customer terminal 14, which are connected by an overhead cylindrical transfer tube 16 dimensioned to receive a cylindrical carrier 18 (best seen in FIGS. 12 and 12A).

In the embodiment shown, teller terminal 12 is positioned within a teller building 20 at a teller station 22 having a window 24 which provides a view out across a first vehicle lane 26 to customer terminal 14. Customer terminal 14 is mounted on an island 28 which defines a second vehicle lane 32 and which island 28 elevates customer terminal 14 a predetermined distance above the surface of vehicle lanes 26 and 32. In the embodiment shown, transfer tube 16 is generally comprised of a plurality of tube sections 42, 44, and 46. As best seen in FIG. 1, a straight tube section 42 extends generally vertically upward from teller terminal 12 and is connected to a curved elbow 44. In the embodiment shown, straight tube section 42 extends through ceiling 34 of teller building 20 and through an opening into a shelter designated 36. Shelter 36, which extends over vehicle lanes 26 and 32, includes a truss 38 which is provided to support a false ceiling 39 by conventional means (not shown). Curved elbow 44 communicates with horizontal tube section 46 which is disposed above false ceiling 39. Horizontal tube section 46 communicates with a second curved elbow section 44 which in turn is connected to a second vertical tube section 42. This vertical tube section 42 communicates with customer terminal 14. Each of the tube sections is fastened to an adjacent section by a tube connection clamp 48. Tube sections 42, 44, and 46 are connected to each other in a manner to ensure a smooth, continuous inner cylindrical passageway, designated "P" in the drawings. Tube sections 42, 44, and 46 are preferably supported from truss 38 by conventional support rods (not shown). Transfer tube 16 (i.e. tube sections 42, 44, and 46) may be formed from metal or plastic, and with respect to the latter, may be transparent or opaque. In the embodiment disclosed in the present specification, transfer tube 16 is formed of commercially available metal tubing having a nominal 4⅞" inner diameter. As will be appreciated from a further reading and understanding of this specification and the disclosed embodiment, the present invention is not limited to a specific commercially available tube size, and in this respect, plastic tubing larger or smaller than 4⅞" may be formed and find advantageous application with the present invention.

A pair of exhaust blower assemblies 52 and 54, shown in FIG. 1, are provided to exhaust air from transfer tube 16 via flexible tubing 56. As shown in FIG. 1, tubing 56 is preferably connected to curved tube sections 44. Blower assemblies 52 and 54 may be supported from truss 38 by conventional means (not shown). Blower assemblies 52 and 54 in and of themselves form no part of the present invention and therefore shall not be described in great detail. Basically, blower assemblies 52 and 54 are identical and are comprised of vacuum blowers. Each blower includes an in-line flap valve (not shown) which permits movement of air in the exhaust direction only. In the embodiment shown, blowers 52, 54 are one stage, single speed, thru-flow blowers (i.e. having one compression fans) manufactured by Ametek, Inc., Lamb Electric Division of Kent, Ohio, capable of moving approximately 112 cubic feet of air per minute. Operation of blower assemblies 52, 54 shall be described in greater detail below.

Figure 12:
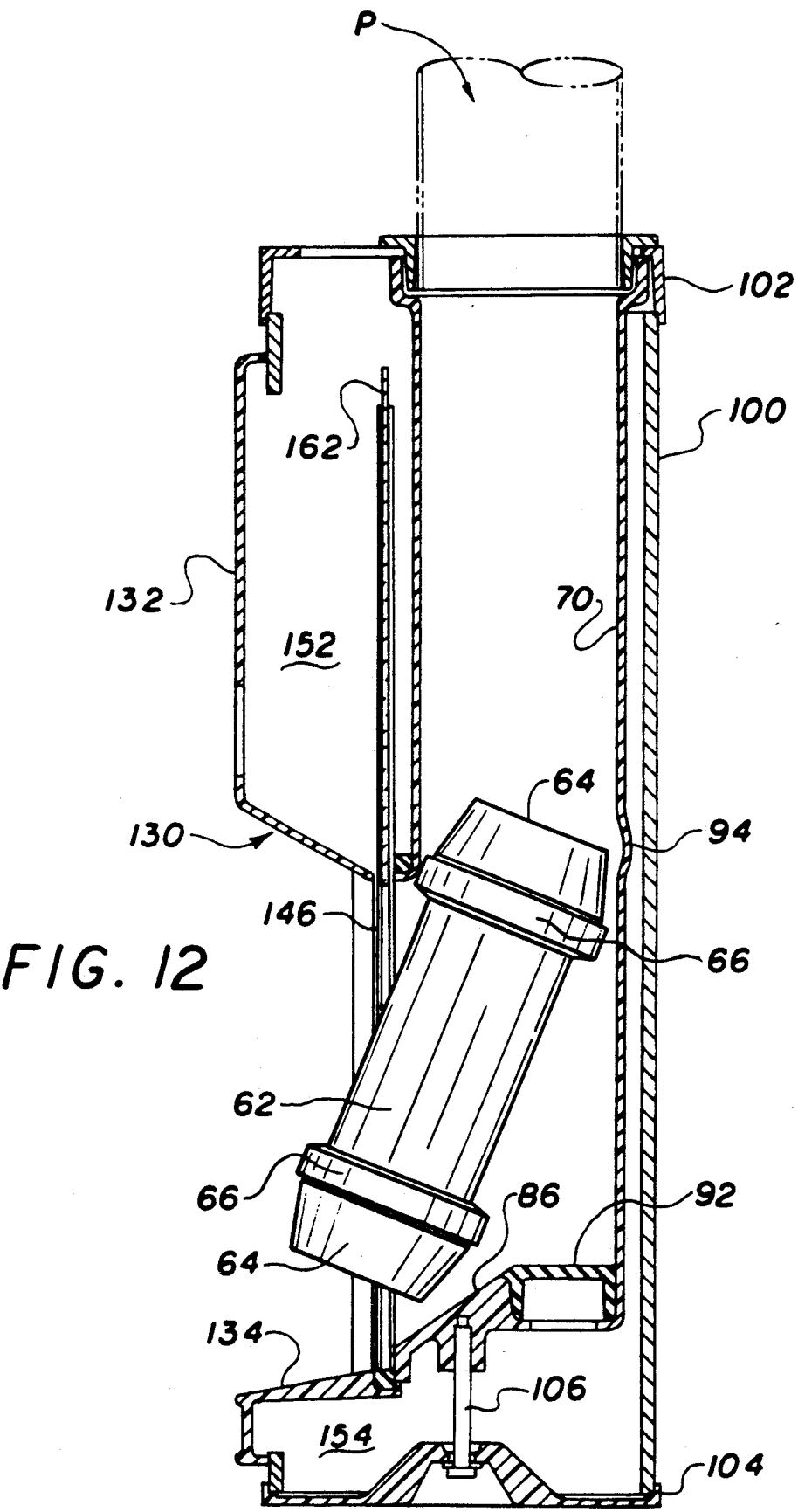
FIGS. 12 and 12A are simplified sectional views of the teller terminal taken generally along line 4—4 of FIG. 2, illustrating the method of insertion of an article carrier into such terminal.
Figure 12A:
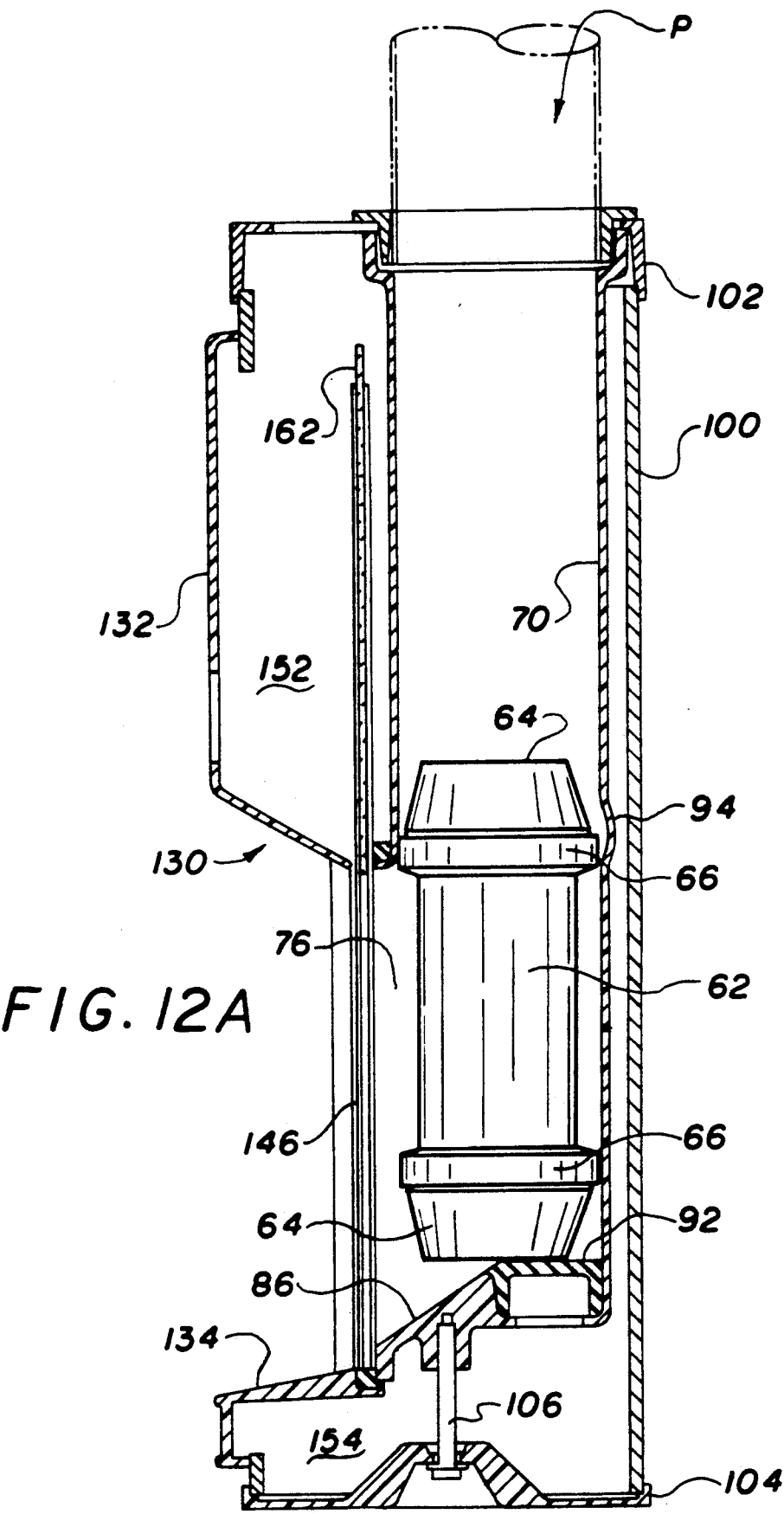

Carrier 18, best seen in FIGS. 12 and 12A, is adapted to carry articles through transfer tube 16 between teller terminal 12 and customer terminal 14 and to be removable from such terminals, i.e. carrier 18 is a "non-captive" carrier. Carrier 18 is basically comprised of a tubular body portion 62 having frustoconical end portions 64. Adjacent each end portion 64 is an annular surface 66 dimensioned to have an outer diameter which closely approximates the inner diameter of transfer tube 16. In this respect, annular surfaces 66 are conventionally referred to as "accelerator rings". Tubular body portion 62 of carrier 18 defines an internal cavity (not shown) for containing the articles to be transferred. Access to the internal cavity may be by a laterally pivotal end cover or flap, by a threaded, removable end cap, or by a side door through the tubular portion of the carrier (not shown).

Referring now to terminals 12 and 14, such terminals are essentially the same and generally include the same operative components. In this respect, only teller terminal 12 shall be described, it being appreciated that the description of teller terminal 12 shall apply equally to the components of the customer terminal 14. To the extent that the terminals are different, such differences shall be pointed out and discussed below.

Figure 4:
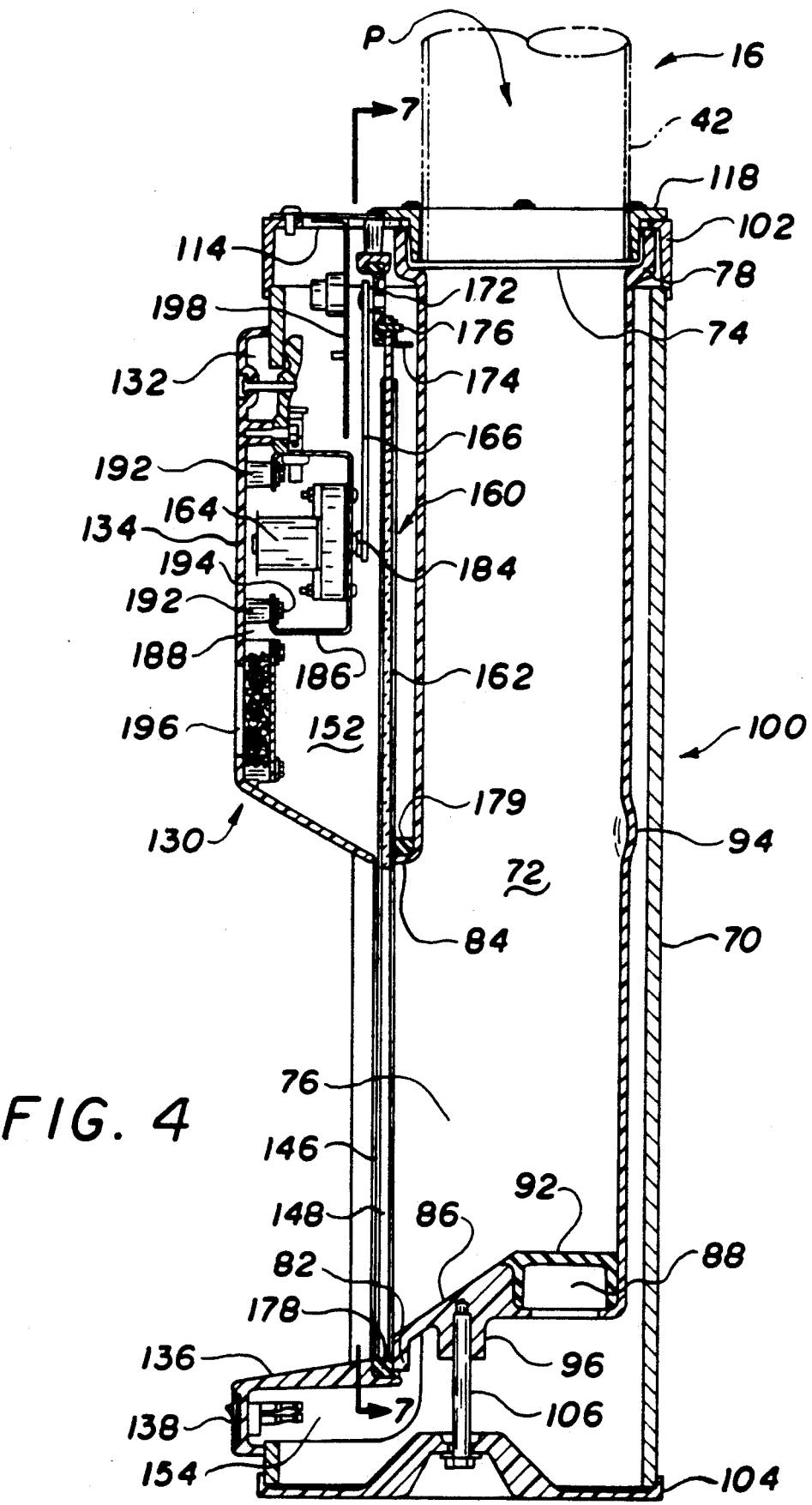
FIG. 4 is a sectional view taken along line 4—4 of FIG. 2.

Referring now to FIGS. 2 and 4, teller terminal 12 is shown. Teller terminal 12 is basically comprised of a carrier receiver 70, an outer housing 100, a facade 130, and a gate mechanism 160.

Figure 6:
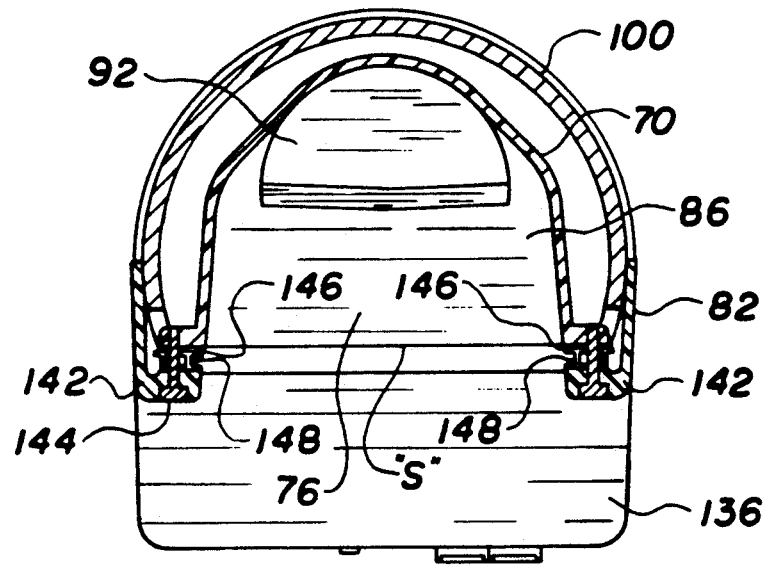
FIG. 6 is a sectional view taken along line 6—6 of FIG. 2.

Carrier receiver 70, best seen in FIG. 4, is tubular in shape and defines an inner carrier receiving chamber 72 which is dimensioned to receive carrier 18 therein and to operatively align carrier 18 with transfer tube 16 to facilitate transfer of carrier 18 therethrough. To this end, carrier receiver 70 has an upper end defining an opening 74 which communicates with tube section 42 of transfer tube 16, and a lower end having a second opening 76 to permit insertion and removal of a carrier to and from the receiving chamber. More specifically, the upper portion of the receiver is substantially cylindrical in shape and has an inner diameter corresponding to the inner diameter of transfer tube 16, and in this respect, represents basically an extension of transfer tube 16. An enlarged annular collar 78 is provided at the upper end of the receiver to permit alignment with section 42 of transfer tube 16, as will be discussed in greater detail below. Second opening 76 is basically an "access opening" and is generally rectangular in shape (as best seen in FIG. 4) and extends laterally from the axis of carrier receiver 70. Access opening 76 extends toward the front of the terminal, i.e. toward the facade 130. The general shape of access opening 76 is best illustrated in FIG. 6. Access opening 76 is dimensioned to have a width sufficient to enable a customer's hand holding carrier 18 to pass therein so as to permit removal or insertion of carrier 18 into carrier receiver 70. Importantly, the lower portion of the receiver 70 is formed to have a generally planar outward facing mounting surface, designated "S" in FIG. 6, about the periphery of access opening 76. Surface S is formed by a generally U-shaped flange 82 which extends along the sides and bottom of access opening 76 and by an end of an outturned edge 84 which extends along the top of access opening 76.

As best seen in FIG. 4, the lower end of carrier 70 is formed to include an outwardly and downwardly inclined portion 86 and a recess 88 dimensioned to receive a bumper 92 formed of a resilient material such as rubber. The bumper 92 is disposed relative to the cylindrical portion of the receiving chamber 72 such that when carrier 18 is resting thereon, the carrier's upper "accelerator ring" (i.e. annular surface 66) is within such cylindrical portion. To facilitate insertion of carrier 18 into carrier receiver 70, according to the present invention, an outwardly projecting relief or recess 94 is formed in the rear portion of receiver 70 behind or to the rear of the outturned edge 84, to enable the upper end portion 64 of the carrier 18 to be inserted and turned therein. Below the inclined portion 86, a downward extending mounting boss 96 having an internally threaded bore is provided.

Figure 5:
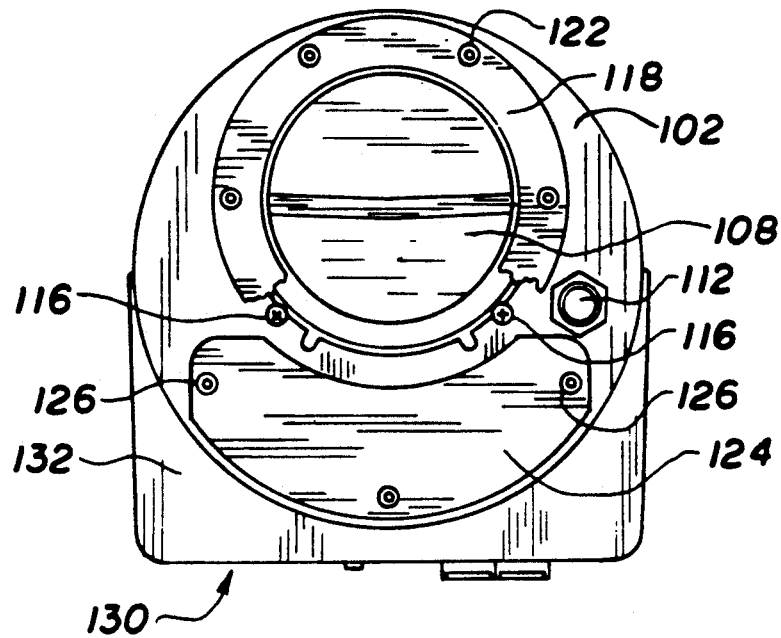
FIG. 5 is a top, plan view of the teller terminal shown in FIG. 2.

In the embodiment shown, the carrier receiver 70 is contained within housing 100. Housing 100 is provided for cosmetic reasons and to contain the operative components of the terminal. Housing 100 is essentially comprised of a tube which is open at both ends and which includes an opening along one side thereof to facilitate access opening 76 and other structural components of the present invention. The open ends of the housing are closed by an upper housing cap 102 and a lower housing cap 104. As best seen in FIG. 4, lower housing cap 104 is secured to the lower end of housing 100 by means of a fastener 106 extending through cap 104 into the threaded bore of boss 96 on the carrier receiver 70. With respect to upper housing cap 102, which is best shown in FIG. 5, cap 102 includes a plurality of apertures extending therethrough. A first aperture 108 is provided to receive transfer tube 16. A second smaller aperture 112 is provided to receive wiring for electrical connections for the operative components of the terminal, and a third generally crescent-shaped aperture 114 to provide access from above into housing 100. As indicated above, first aperture 108 is dimensioned to receive transfer tube 16 therethrough. As best seen in FIG. 5, upper housing cap 102 is secured to the carrier receiver 70 by means of threaded fasteners 116 extending through upper housing cap 102 into threaded bores (not shown) in the collar 78 of carrier receiver 70. An annular flange 118 surrounds transfer tube 16 and positions tube 16 relative to the upper portion of the carrier 70. Fasteners 122 are provided to secure the flange 118 to upper housing cap 102. Gasket or sealing means (not shown) are provided around the flange 118 to provide an airtight seal between transfer tube 16 and the upper portion of the carrier receiver 70. With respect to the second aperture 112 in upper housing cap 102, such opening is dimensioned to receive a standard electrical fitting connectible to an electrical conduit or the like which contains electrical lines connecting terminal 12 to terminal 14 as well as to blowers 52 and 54. Third aperture 114 (best seen in FIG. 4) is provided to facilitate access into the housing 100. A crescent-shaped cover plate 124 is secured to upper housing cap 102 to close such opening by means of fasteners 126 as is conventionally known.

Facade 130 is generally provided to contain the operative components of terminal 12 and is dimensioned to generally extend across the front half of the housing 100 between the upper housing cap 102 and the lower housing cap 104. In this respect, facade 130 is formed to include an outward (i.e. forward) projecting, generally rectangular, upper portion 132 having a generally planar front panel 134, and a smaller outwardly projecting, generally rectangular, lower portion 136 having a smaller planar front portion 138. Upper portion 132 of the facade 130 is connected to lower portion 136 by spaced-apart columnar portions 142, between which is defined a rectangular opening which is dimensioned to correspond to access opening 76 in carrier receiver 70.

As best seen in FIGS. 2 and 6, facade 130 is secured to carrier receiver 70 by fasteners 144 which extend through columnar portions 142 into U-shaped flange 82 surrounding access opening 76 of the carrier receiver 70. A pair of elongated, straight guide members 146 are secured between facade 130 and carrier 70 receiver by fasteners. Guide members 146 are oriented to extend generally parallel to each other between facade 130 and receiver carrier 70, as best illustrated in FIG. 4. Each guide member 146 includes a generally U-shaped track or slot 148 formed therein.

Figure 10:
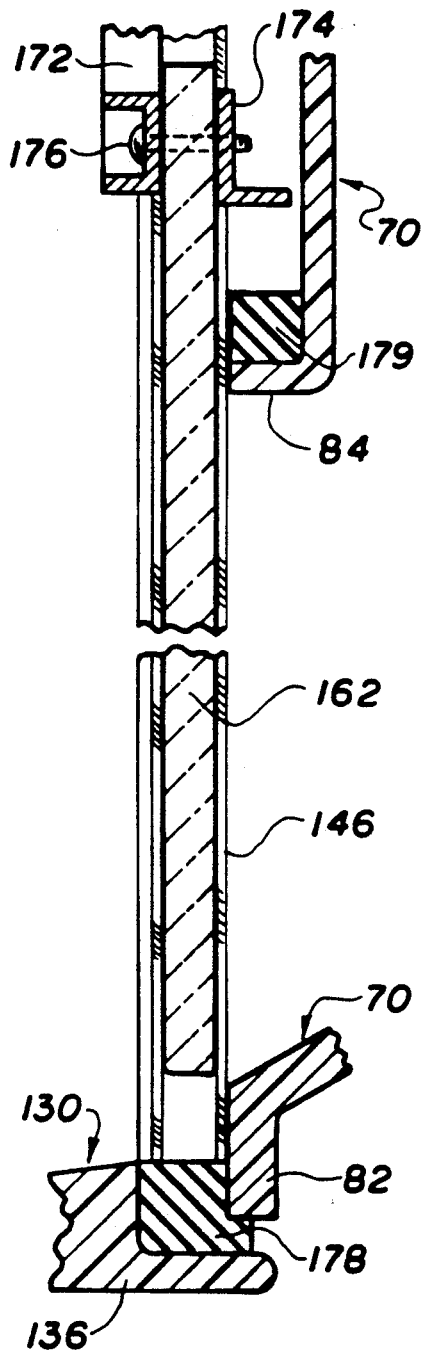
FIGS. 10 and 11 are enlarged, sectional views of the gate portion of the gate mechanism taken generally along line 10—10 of FIG. 2 illustrating the sealing arrangement therefor.
Figure 11:
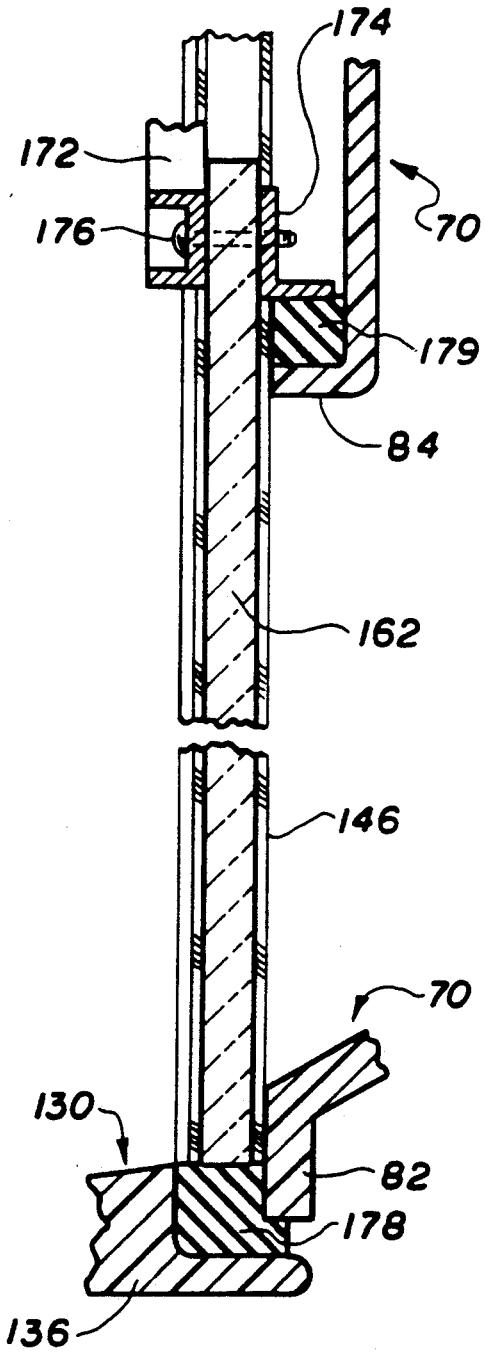

Upper portion 132 of facade 130 defines an upper compartment 152 between it and the upper portion of carrier receiver 70. Compartment 152 is dimensioned to contain the operative components of teller terminal 12 including portions of gate mechanism 160 which is operable to open and close access opening 76. Gate mechanism 160 is generally comprised of a planar gate 162, a gate drive motor 164, and an elongated actuator arm 166 operatively connecting gate drive motor 164 to planar gate 162. Gate member 162 is generally comprised of a rectangular, planar sheet member dimensioned to be received within U-shaped slots 148 of the guide members 146 and to be movable therethrough. The upper edge of gate member 162 includes a bracket 172 (best seen in FIG. 7) and a generally L-shaped element 174 (best seen in FIGS. 10 and 11) attached thereto. Bracket 172 and element 174 are secured to gate member 162 by fastener 176. A strip 179 of generally resilient sealing material, such as a closed cell PVC foam, is provided along the upper surface of outturned edge 84 of carrier receiver 70. Strip 179 is dimensioned to engage element 174 and form a generally airtight seal therewith, when gate member 162 is in a closed position covering access opening 76, as shown in FIG. 11. A similar strip 178 is disposed at the lower end of guide member 146 between flange 82 of carrier receiver 70 and lower portion 136 of facade 130, as best seen in FIGS. 10 and 11. This strip 178 is operable to engage, and form a generally airtight seal with, the lower edge of gate member 162 when it is in the closed position shown in FIG. 11. Bracket 172 includes an elongated slot 180 which is oriented to be generally perpendicular to the path of travel of the planar gate member 162. Slot 180 is dimensioned to receive a pin 182 which is mounted at one end of elongated actuator arm 166. The other end of actuator arm 166 is fastened to the spindle 184 of drive motor 164 wherein rotation of drive motor 164 causes rotation of actuator arm 166 thereabout. Drive motor 164 is mounted to a generally C-shaped bracket 186 having leg portions 188 which are secured to a mounting boss 192 extending from the inner surface of front panel 134 of the facade 130 by fasteners 194. Drive motor 164 is basically comprised of a reversible electric DC motor of variable speed and torque wherein the speed and torque will change proportionally to a change in applied voltage. In this respect, according to the present invention, the speed and torque of drive motor 164 are viable to vary the driving force on gate member 162 depending upon its direction of motion. In the embodiment shown, a 24 volt permanent magnet DC gear motor operable at 20 revolutions per minute (RPM) with a maximum torque of 150 ounce-inches, manufactured by Barber Colman, Inc. is used. A microphone and a speaker (not shown) are provided within upper compartment 152 to permit voice transfer between customer terminal 14 and teller terminal 12. To this end, the face panel of the upper portion of facade 130 includes a baffle 196 formed therein and upper compartment 152 includes an audio circuit board 198.

Figure 3:
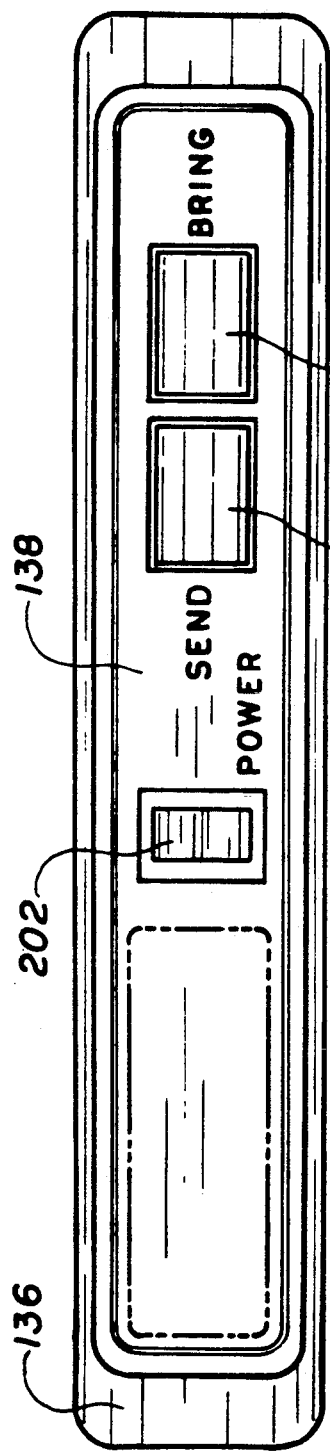
FIG. 3 is an enlarged front view of the operation panel from a bank teller terminal of the pneumatic system shown in FIG. 1.

Referring now to lower portion 136 of the facade 130, such portion defines a compartment 154 operable to contain control elements of teller terminal 12. In this respect, FIG. 3 is an enlarged front view of front panel 138 of lower portion 136 of facade 130. Front panel 136 is essentially a terminal control panel and includes the external portions of button 202, 204, 206 designated "POWER", "SEND", and "BRING" respectively. "POWER" button 202 is operable to control power to the system, whereas "SEND" button 204 and "BRING" button 206 are operable to initiate transfer of carrier 18 between teller terminal 12 and customer terminal 14.

Figure 3A:
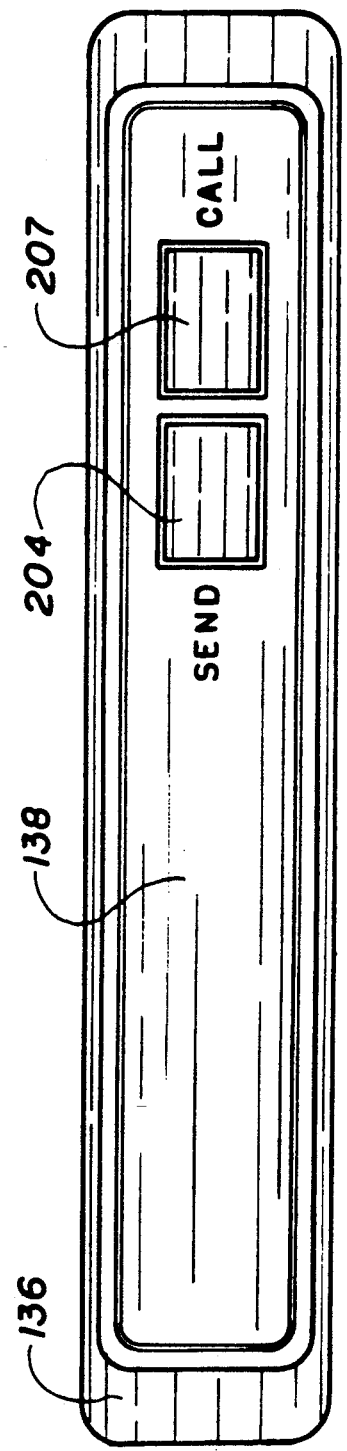
FIG. 3A is a front view of the operation panel of a customer terminal of the pneumatic system shown in FIG. 1.
Figure 4A:
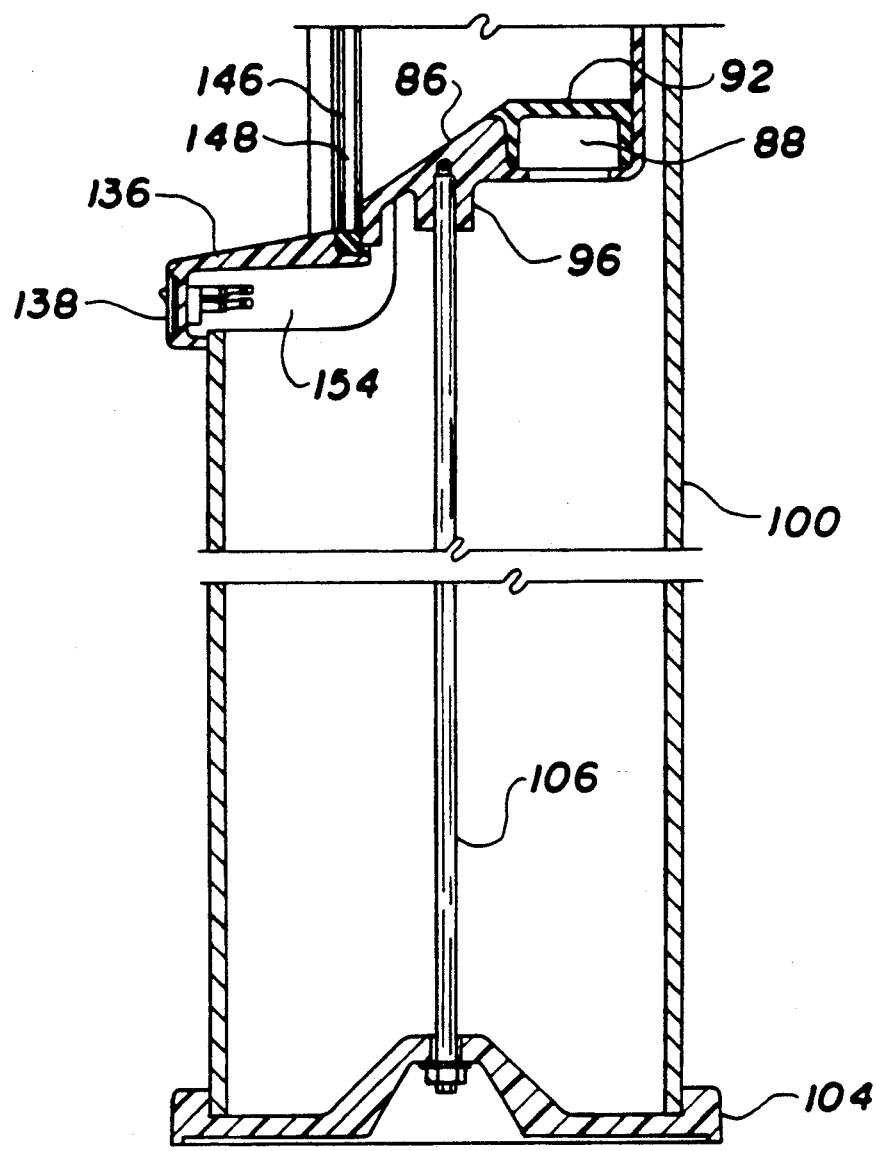
FIG. 4A is a partially broken, sectional view of the lower portion of a customer terminal for comparison with a similar sectional view of the teller terminal shown in FIG. 4 to illustrate the structural similarities therebetween.

Referring now to customer terminal 16, as indicated above, the operative components of such terminals are essentially identical to those previously described with respect to teller terminal 12. One difference between the respective terminals can be seen with reference to FIG. 3A, which shows an enlarged view of front panel 138 of lower portion 136 of facade 130 of customer terminal 14, including only a "SEND" button 204 and "CALL" button 207. Another difference between teller terminal 12 and customer terminal 14 can be seen within FIG. 4A, which shows how housing 100 of customer terminal 14 being elongated such that it may be a ground standing unit. By merely lengthening housing 100 and by providing an elongated fastener rod 106 to connect lower housing cap 104 to the lower portion of carrier receiver 70. In this respect, in the embodiment shown, housing 100 of the respective terminals is basically comprised of standard, commercially available, drain pipe which is cut to length for the desired length of the terminals. Lastly, one further difference between teller terminal 12 and customer terminal 14, as will be noted from the drawings, is that teller terminal 12 is supported by the transfer tube 16. In this respect, the lower end of section 42 of transfer tube 16 is dimensioned to include an outwardly extending flange (not shown). This flange, acting in conjunction with the mounting flange 118 and upper housing cap 102, enables teller terminal 12 to be mounted on the transfer tube 16.

Referring now to the operation of system 10, an electrical control circuit (not shown) establishes the operating sequence of blowers 52, 54 and gate drive motors 164 of teller terminal 12 and customer terminal 14. In this respect, system 10 operates in a predetermined, timed sequence based upon commands from "SEND" button 204 and "BRING" button 206. Power to system 10 is initiated by a bank teller utilizing "POWER" button 202 on teller terminal panel 138. When energized, system 10 will most typically have an initial position wherein the carrier 18 is in or near teller terminal 12 with gate member 162 on teller terminal 14 in an open position. Customer terminal 14, on the other hand, will have gate member 162 in a downed position covering access opening 76 to transfer tube 16. Transfer of the carrier 18 from teller terminal 12 to customer terminal 14 is accomplished by inserting carrier 18 into carrier receiving chamber 72 of teller terminal 12. In this respect, as best illustrated in FIGS. 12 and 12A, insertion is accomplished by placing carrier 18 into access opening 76 at an angle. Relief 94 formed in the back wall of carrier receiver 70 permits the upper edge of carrier 18 to be moved into the cylindrical upper portion of carrier receiver 70, such that carrier 18 may be set into a position as best seen in FIG. 12A. In this position, upper annular surface 66, i.e. the upper "accelerator ring", is positioned within the cylindrical portion of carrier receiver chamber 72. With carrier 18 in this position, a bank teller may initiate transfer of carrier 18 to customer terminal 14 by pressing the "SEND" button 204 on panel 138 of teller terminal 12. This action initiates exhaust blower 54 above customer terminal 14, which evacuates air from passage "P" of transfer tube 16. As a result, a vacuum is drawn in front of carrier 18 in passage "P" and against the inner surface of planar gate member 162 of customer terminal 14 which is in a "closed position" as indicated above. Air is permitted into passage "P" of transfer tube 16 behind carrier 18 through access opening 76 of teller terminal 12. The atmospheric pressure behind carrier 18 provides the impetus for moving carrier 18 through tube 16. Importantly, according to the present invention, as blower 54 evacuates air from passage "P", it draws planar gate member 162 of customer terminal 14 into engagement with the inner side walls of guide members 146. In other words, the vacuum drawn against the inner surface of planar gate member 162 draws it into tighter engagement with guide members 146, thereby reducing any gap therebetween and reducing any air loss or air "bleed-by" therebetween. Thus, the combined use of a planar gate member 162 and a vacuum blower system, produces a system which reduces air loss around gate mechanism 160, thereby increasing the vacuum against the leading end of carrier 18. This in turn increases the propelling force exerted on carrier 18, and as a result, increases the load which may be carried thereby.

As carrier 18 moves through transfer tube 16, it eventually passes the exhaust blower 54, at which point carrier 18 is generally above customer terminal 16. The operation of exhaust blower 54 is timed by conventional circuitry (not shown) wherein exhaust blower 54 is deactivated once carrier 18 has passed thereby. Once past exhaust blower assembly 54, the speed of the carrier rapidly decreases as it encounters a cushion of air in front of it. At this point, a pressure increase is created within carrier receiver chamber 72 of carrier receiver 70 as carrier 18 compresses the residual air within transfer tube section 42 above customer terminal 14. In this respect, because gate member 162 on customer terminal 14 is in a closed position, air cannot escape through access opening 76 in customer terminal 14. Due to the airtight seal surrounding transfer tube 16 and carrier receiver 70 and the engagement between gate member 162, strips 178, 179 and guide members 146, a relatively airtight system is provided. This creates an "air cushion" below carrier 18 (formed by residual air within the portion of transfer tube 16 below carrier 18) which decreases the speed thereof. In the embodiment shown, when carrier 18 passes the junction where flexible tubing 56 connects blower 54 to tube section 44, gate member 162 of customer terminal 14 moves away or "pops"

away from the inner surfaces of guide members 146 as the vacuum within carrier receiver chamber 72 is replaced by increased pressure resulting from compression of residual air within carrier receiver chamber 72 and tube section 42.

Carrier 18 settles into customer terminal 14 under the influence of gravity on a cushion of air, carrier 18 slowly dropping into customer terminal 14 as air within the tube system below carrier 18 slowly "blows by" or "bleeds by" annular surfaces (accelerator rings) 66 on carrier 18. In addition, small amounts of air may bleed around the spacing formed between gate member 162 and guide members 146. After a predetermined period of time sufficient for carrier 18 to settle into carrier receiver 70 of customer terminal 14, the control circuit will cause gate member 162 to open thereby allowing access by the customer to open carrier 18. At the same time, drive motor 164 in teller terminal 12 is initiated to cause gate member 162 to move to a closed position in anticipation of return of carrier 18 thereto.

Figure 7:
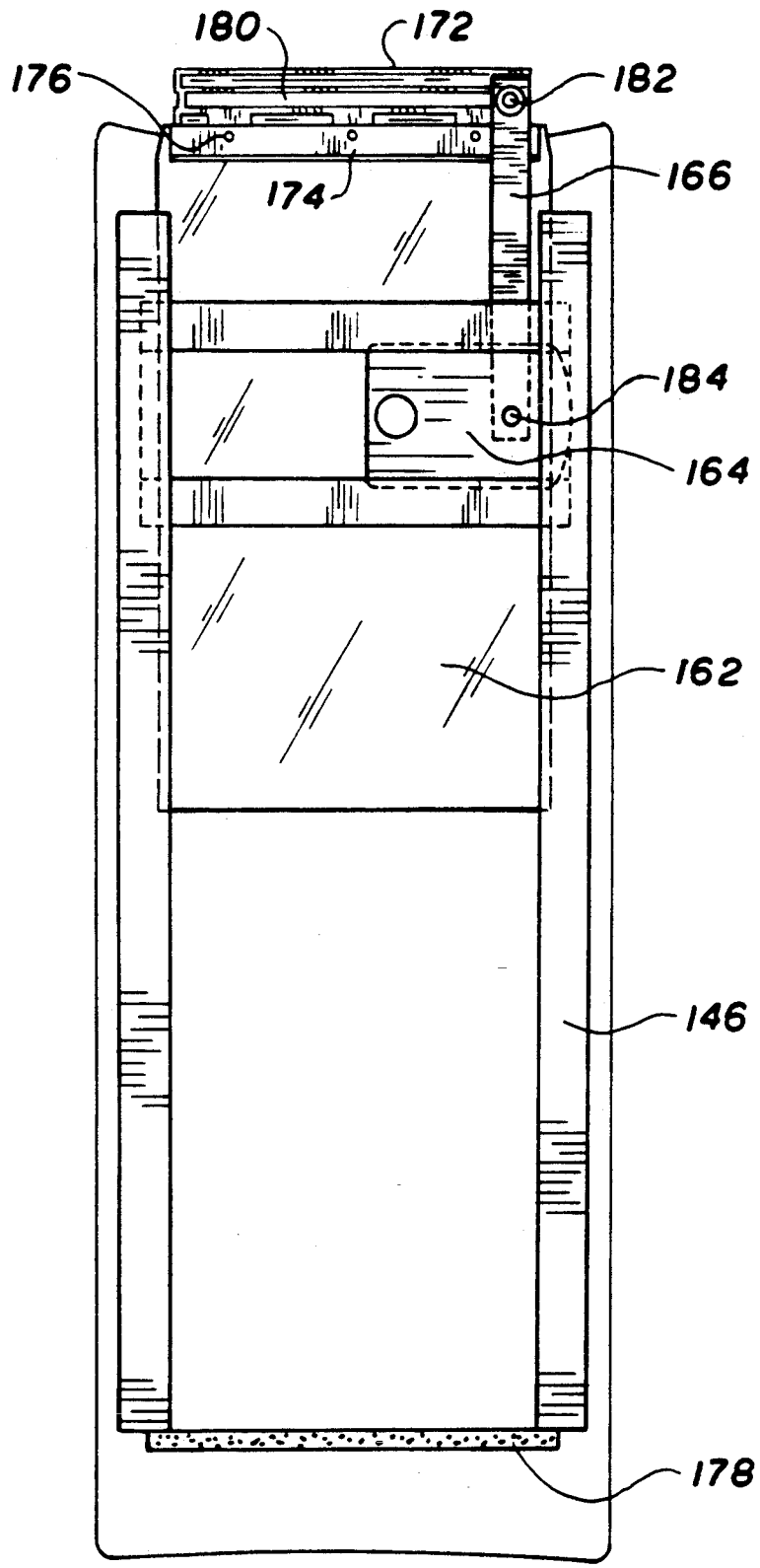
FIG. 7 is a sectional view taken along line 7—7 of FIG. 4 illustrating a gate mechanism utilized in the pneumatic transfer system shown in FIG. 1.
Figure 8:
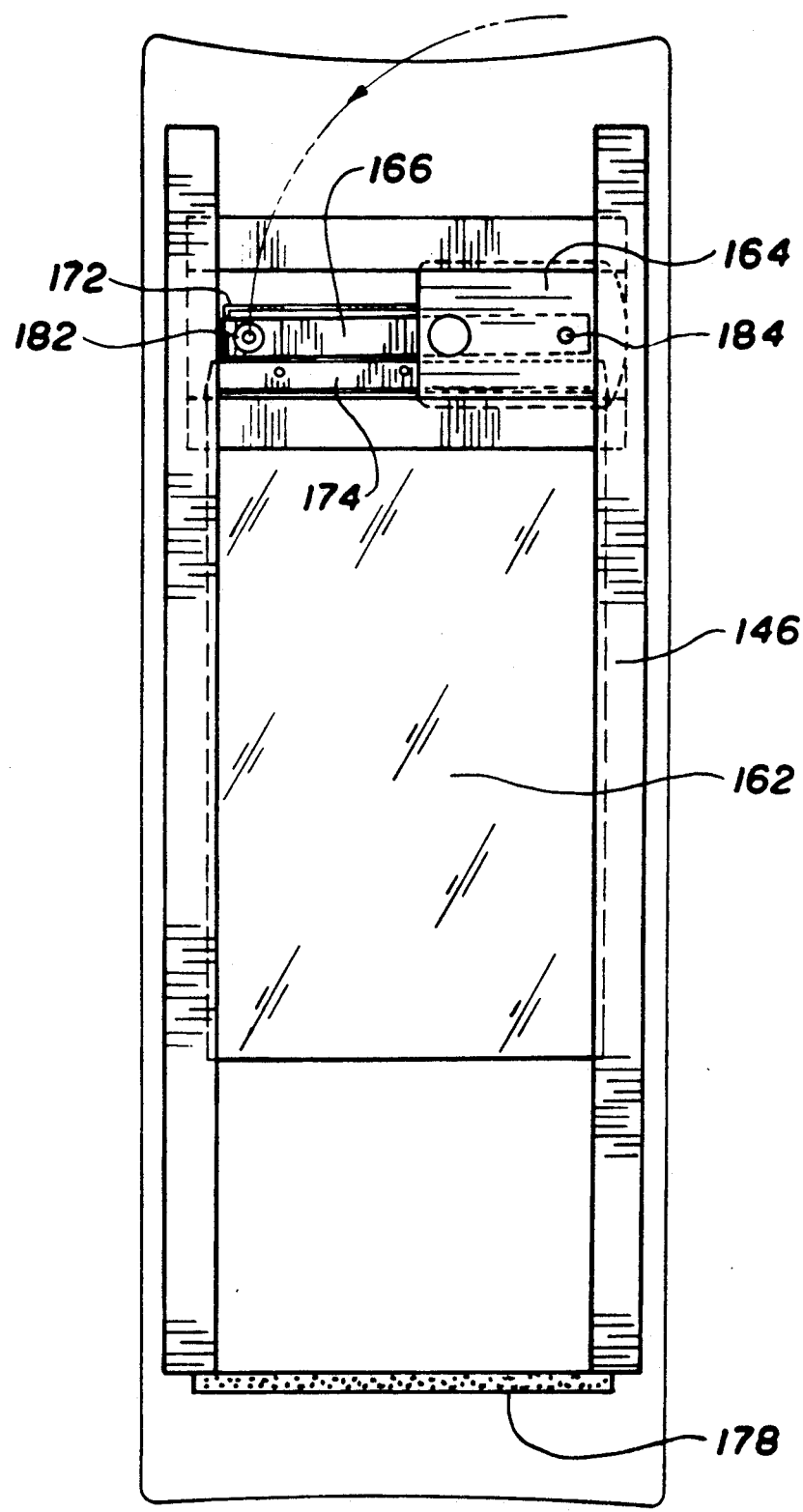
FIGS. 8 and 9 are views of the gate mechanisms shown in FIG. 7 which illustrate the operation of thereof.
Figure 9:
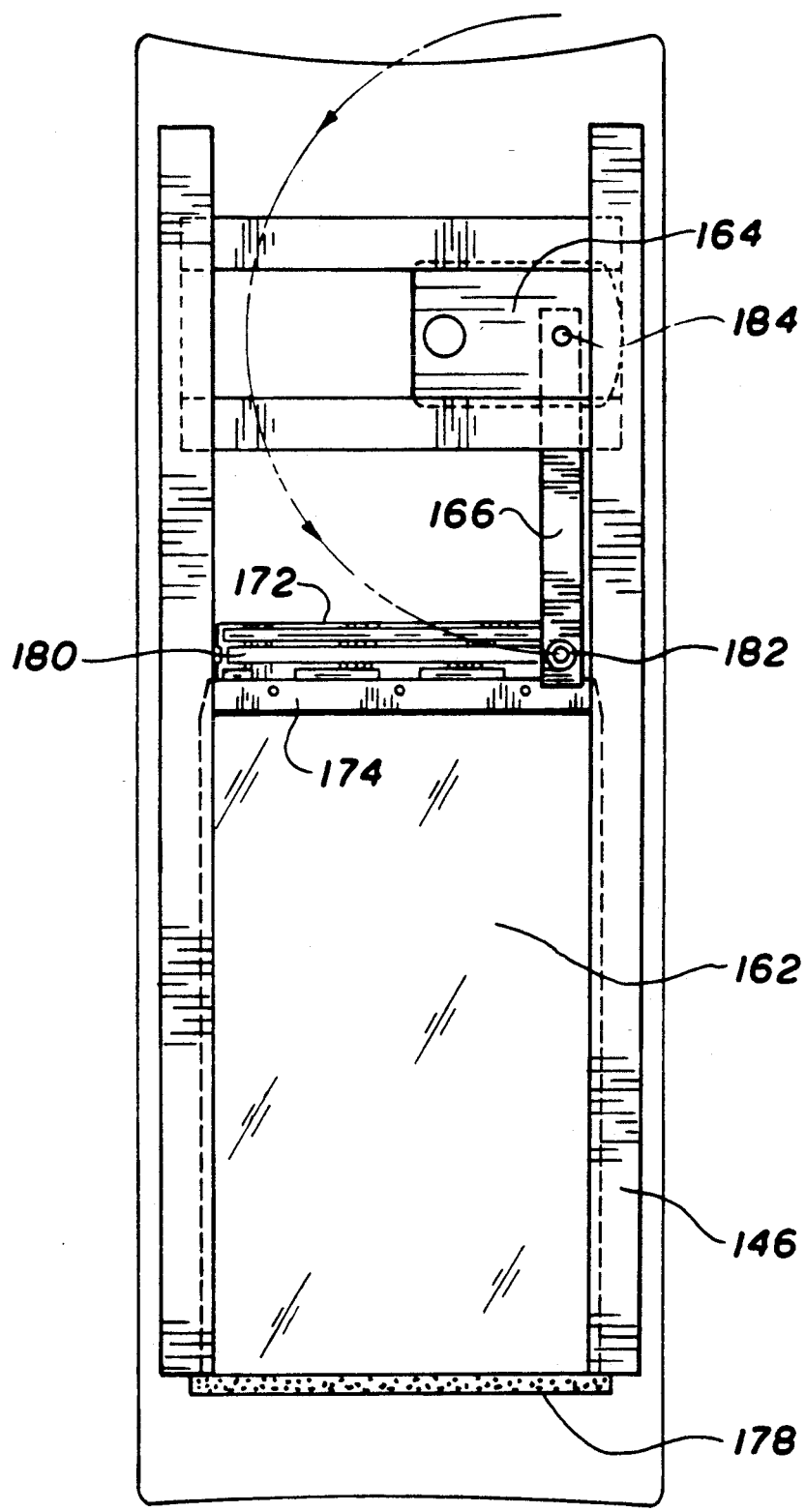

The operation of gate mechanism 160 is best illustrated with reference to FIGS. 7, 8, and 9, which illustrate movement of gate member 162 from an open position (FIG. 7) to a closed position (FIG. 9). In this respect, the control circuit will activate drive motor 164 which in turn will cause rotation of the actuator arm 166 in a counter-clockwise direction along an arcuate path (as illustrated in FIG. 9). Movement of pin 182 through slot 180 on the upper edge of gate member 162 will cause gate member 162 to move downward as pin 182 travels through slot 180.

Importantly, according to the present invention, the applied voltage to drive motor 164 is reduced when gate member 162 is being moved downward to its "closed position". In this respect, because the speed and torque of drive motor 164 will change proportionally to the change in voltage, this reduction in applied voltage reduces the applied driving force exerted on gate member 162 by drive motor 164. Thus, the driving force of drive motor 164 can be set such that any resistance exerted on the lower edge of gate member 162 will generally stall drive motor 164. Consequently, an obstruction underneath the gate member 162, such as a customer's hand or fingers, will not be crushed or pinched by downward movement of gate member 162. Moving gate member 162 from a "closed position" to the "open position", merely involves reversing the voltage applied to drive motor 164, wherein actuator arm 166 swings in a clockwise direction causing gate member 162 to move upward as pin 182 travels through slot 180.

The upward movement of gate member 162 will generally require a slightly greater driving force from drive motor 164 than required to lower gate member 162. Moreover, it is desirable to increase the upward speed of gate member 162, to reduce the over cycle time of the system. Accordingly, according to the present invention, the applied voltage to drive motor 164 to move gate member 162 to its "open position" is greater than the voltage applied to drive motor 164 when moving gate member to its "closed position". The higher voltage results in higher motor speed and torque and quicker movement of gate member 162 in the upward direction.

Figure 13A:
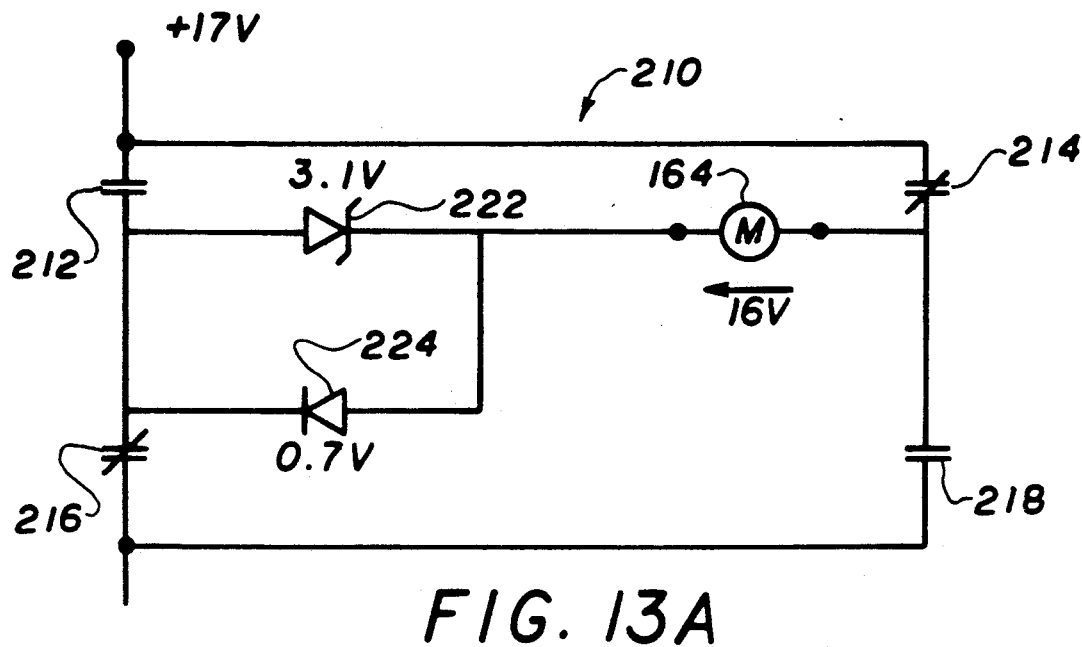
FIGS. 13A and 13B show a drive motor control circuit according to the present invention.
Figure 13B:
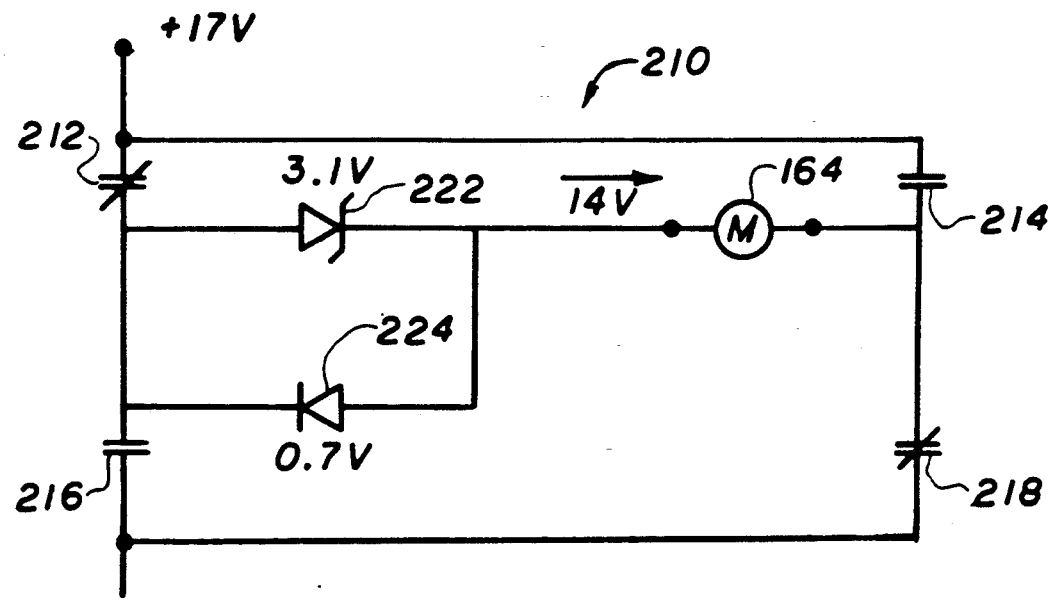

FIGS. 13A and 13B show a drive motor control circuit 210 for controlling the direction of motion, and voltage to, drive motor 164, wherein FIG. 13A shows the configuration of circuit 210 for moving gate member 162 in an upward direction toward its "open position" and FIG. 13B showing the configuration of circuit 210 with gate member 162 moving in a downward direction toward the "closed position". Drive motor control circuit 210 shows drive motor 164 arranged together with relays 212, 214, 216, 218, and diodes 222, 224. FIG. 13A shows circuit 210 with relays 214, 216 closed and relays 212, 218 open to produce an electrical circuit through motor 164 and diode 224 in the direction shown. With an applied voltage of 17 Volts to drive motor circuit 210 and voltage drop of 0.7 Volts across diode 224, the applied voltage to drive motor 164 is approximately 16 Volts. By opening relays 214, 216, and closing relays 212, 218, the direction of drive motor 164 is reversed and the applied voltage thereto is reduced by diode 222. Circuit 210 thus provides a simple yet effective means for varying the voltage to, and driving force of, gate drive motor 164.

The present invention thus provides a transfer system which is relatively compact in relation to the size of the carrier used therewith, yet is capable of transferring relatively heavy loads due to the efficient gate mechanism, blower assembly, and sealing arrangement used therein. By utilizing a planar gate member 162, which is pneumatically sealable against a generally planar surface, together with a vacuum blower assembly, the overall air loss or bleed-by around access opening 76 to system 10 is substantially reduced, thereby improving the overall efficiency of system 10 and its load carrying capacity. More importantly, the present invention provides a unique gate mechanism 160 which is adapted to prevent injury to a customer while not affecting the efficiency or operating speed of the system. In this respect, the present invention provides a system which is compact, simple, safe, and easy to use.

While the present invention has been described with respect to a pneumatic transfer system for use in banking operations, it will be appreciated that the present system has wider, broader applications and may be used in any application where point-to-point transfer of articles is desired. Moreover, while the present invention has been described with respect to a non-captive system, aspects of the present invention may find advantageous application in non-cylindrical captive systems. In this respect, modifications and alterations will occur to others upon their reading and understanding of the specification. It is intended that all such modifications and alterations be included insofor as they come within the scope of the patent as claimed or the equivalents thereof.

We claim:

1. A system for pneumatically transferring articles between two spaced-apart locations comprising:

a first terminal and a second terminal each having a carrier access opening therein;

an overhead transfer tube connecting said first terminal to said second terminal;

a non-captive, tubular carrier positionable within said transfer tube to be pneumatically transferred through said tube between said first and second terminals, said carrier being manually insertable into and removable from said terminals through said access openings;

a gate mechanism on each of said terminals including a generally planar gate member movable between a first position closing said access opening and a second position removed from said access opening, and reversible drive means operable to move said gate member between said first position and said second position;

a first blower assembly attached to said transfer tube above said first terminal and a second blower assembly attached to said transfer tube above said second terminal, said blower assemblies operable to create a vacuum in said tube; and circuit control means operatively connected to said reversible drive means and said blower assemblies operable to transfer said carrier through said tube from one of said first and second terminals to the other of said first and second terminals by:

1) activating said drive means on said one of said first and second terminals to move said gate member to said second position to create atmospheric pressure behind said carrier;

2) activating said drive means on said other of said first and second terminals to move said gate member thereon to said first position, and 3) activating said blower assembly above said other terminal to draw said carrier under vacuum to a position above said other terminal wherein said carrier descends into said other terminal under an influence of gravity.

2. A system as defined in claim 1 wherein said circuit control means includes means for causing said reversible drive means on said first and second terminals to exert a greater driving force on said gate members of said first and second terminals when moving said gate members toward said second position.

3. A system as defined in claim 1 wherein each of said gate mechanism on said first and second terminals further includes an actuator arm having one end secured to said drive means on said first and second terminals for movement therewith and another end attached to said planar gate member on said first and second terminals to move said gate member between said first and second positions.

4. A system as defined in claim 3 wherein each of said reversible drive means is a reversible motor and each of said actuator arms includes a pin dimensioned to be received in a slot in each respective said planar gate member.

5. A system for pneumatically transferring articles between two spaced-apart locations having first and second terminals which receive and dispatch the articles, each terminal including:

a carrier receiver defining and having an internal cavity dimensioned to receive an article carrier therein and position said carrier in operable alignment with a transfer tube, said carrier receiver including a first opening communicating said cavity with said transfer tube and a second opening for insertion and removal of said carrier into and from said cavity;

a generally planar gate slidably movable over said second opening between a first position wherein said gate covers said second opening and a second position wherein said gate is removed from said second opening; and means for moving said planar gate to said first position wherein it is maintained until said carrier is received by said carrier receiver, and for moving said planar gate to said second position wherein it is maintained until said carrier is dispatched from said carrier receiver to said transfer tube.

6. A system as defined in claim 5 wherein each of said terminals has a generally tubular outer housing containing said carrier receiver.

7. A system as defined in claim 6 wherein each said outer housing is a cylindrical drain pipe.

8. A system as defined in claim 6 wherein said cavity in each said carrier receivers is generally cylindrical in shape.

9. A system as defined in claim 5 wherein at least one of said terminals is supported by said transfer tube.

10. A system as defined in claim 5 wherein said transfer tube is disposed above said terminals.

11. A system as defined in claim 5 further comprised of two vacuum blowers which are individually connected to said transfer tube, said vacuum blowers being connected to said transfer tube at spaced-apart locations above said first and second terminals.

12. A system as defined in claim 5 wherein each of said generally planar gates is movable through a track along a generally linear path.

13. A pneumatic transfer terminal for receiving and dispatching a non-captive, tubular article carrier of predetermined length from and to a single pneumatic transfer tube, said terminal comprising:

a carrier receiver having an internal chamber dimensioned to receive said article carrier therein and to position said carrier in operable alignment with said transfer tube, said carrier receiver including a first opening for communicating said chamber with said transfer tube and a second opening for insertion and removal of said carrier into and from said chamber, said second opening having a maximum dimension shorter than said carrier wherein said carrier must be inserted in said chamber at an angle relative to said transfer tube;

means for connecting said carrier receiver to said transfer tube; and slidable gate means operable to open and close said second opening, said gate means including:

a generally planar gate member movable between a first position where said gate member covers said second opening and a second position wherein said gate member is removed from said opening;

reversible motor means;

actuator means operatively connecting said motor means to said planar gate member for moving said gate member between said first and said second positions along a path generally parallel to said transfer tube; and means for initiating said motor means to move said gate member to said first position and maintaining said gate member in said first position until said carrier is received by said carrier receiver, said means for initiating being further operable to move said gate member to said second position and maintaining said gate member in said second position until said carrier is dispatched from said carrier receiver to said transfer tube.

14. A pneumatic transfer terminal for receiving non-captive, tubular article carrier of predetermined length from and to a single pneumatic transfer tube, said terminal comprising:

a carrier receiver having an internal chamber dimensioned to receive said article carrier therein and to position said carrier in operable alignment with said transfer tube, said carrier receiver including a first opening for communicating said chamber with said transfer tube and a second opening for insertion and removal of said carrier into and from said chamber, said second opening having a maximum dimension shorter than said carrier wherein said carrier must be inserted in said chamber at an angle relative to said transfer tube;

means for connecting said carrier receiver to said transfer tube; and gate means operable to open and close said second opening, said gate means including;
- a generally planar gate member and an elongated slot, formed in said gate member, said gate member being movable between a first position where said gate member covers said second opening and a second position wherein said gate member is removed from said second opening;
- reversible motors means; and
- actuator means operatively connecting said motor means to said planar gate member for moving said gate member between said first and said second positions;
- said actuator means including a pin dimensioned to be received in said slot in said gate member, said actuator means being movable along a predetermined path, movement of said actuator means along said path causing said gate member to move between said first and said second positions as said pin moves through said slot.

15. A pneumatic transfer terminal as defined in claim 14 wherein said gate means further includes track means for receiving said planar gate member, said track means operable to confine said planar gate member to move along a linear path between said first and second positions.

16. A system for pneumatically transferring articles between two spaced-apart locations comprising:
- a first terminal and a second terminal each having a carrier access opening therein;
- an overhead transfer tube connecting said first terminal to said second terminal;
- a non-captive, tubular carrier positionable within said transfer tube to be pneumatically transferred through said first and second terminals, said carrier being manually insertable into removable from said terminals through said access openings;
- a gate mechanism on each of said terminals including a generally planar gate member movable between a first position closing said access opening and a second position removed from said access opening, and reversible drive means of variable torque operable to move said gate member between said first position and said second position;
- blower means attached to said transfer tube operable to create a vacuum in said transfer tube; and
- circuit control means operatively connected to said reversible drive means and said blower means operable to transfer said carrier through said tube from one of said first and second terminals by activating said drive means of said terminals to move said gate members to predetermined positions and by activating said blower means, said control circuit including means to reduce the torque of said reversible drive means when moving said gate member of said terminals toward said first position.

* * * * *